United States Patent [19]

Orozco

[11] 3,831,716

[45] Aug. 27, 1974

[54] BICYCLE FOOT BRAKES

[76] Inventor: Hector Mendoza Orozco, Adolfo Prieto No. 1709, Col. del Valle, Mexico 12 D.F.

[22] Filed: June 21, 1973

[21] Appl. No.: 372,114

[52] U.S. Cl. .............................. 188/24, 192/45.1
[51] Int. Cl. ............................................. B62l 5/00
[58] Field of Search .............................. 188/24–26; 192/41 R, 45.1

[56] References Cited
UNITED STATES PATENTS

| 2,633,949 | 4/1953 | Lavash | 192/41 R |
| 3,386,544 | 6/1968 | Matsuda | 192/45.1 |

FOREIGN PATENTS OR APPLICATIONS

| 915,933 | 6/1945 | France | 188/26 |
| 700,993 | 12/1953 | Great Britain | 188/24 |
| 727,086 | 3/1955 | Great Britain | 188/24 |
| 442,149 | 11/1948 | Italy | 188/24 |

Primary Examiner—Trygve M. Blix
Assistant Examiner—Sherman D. Basinger
Attorney, Agent, or Firm—Ladas, Parry, Von Gehr, Goldsmith & Deschamps

[57] ABSTRACT

This invention relates to improvements in foot brakes for bicycles of the type that when turning the pedals in the direction opposite to forward, a mechanism is set in motion which prevents turning of one of the bicycle's wheels. This mechanism consists of lever including an annular portion coupled to the pedal and a lug pivotly fixed at one end of a guiding and joining structure which slidingly housed a portion of a bolt, the other portion of which is fixed to a yoke which is the brake as such.

3 Claims, 3 Drawing Figures

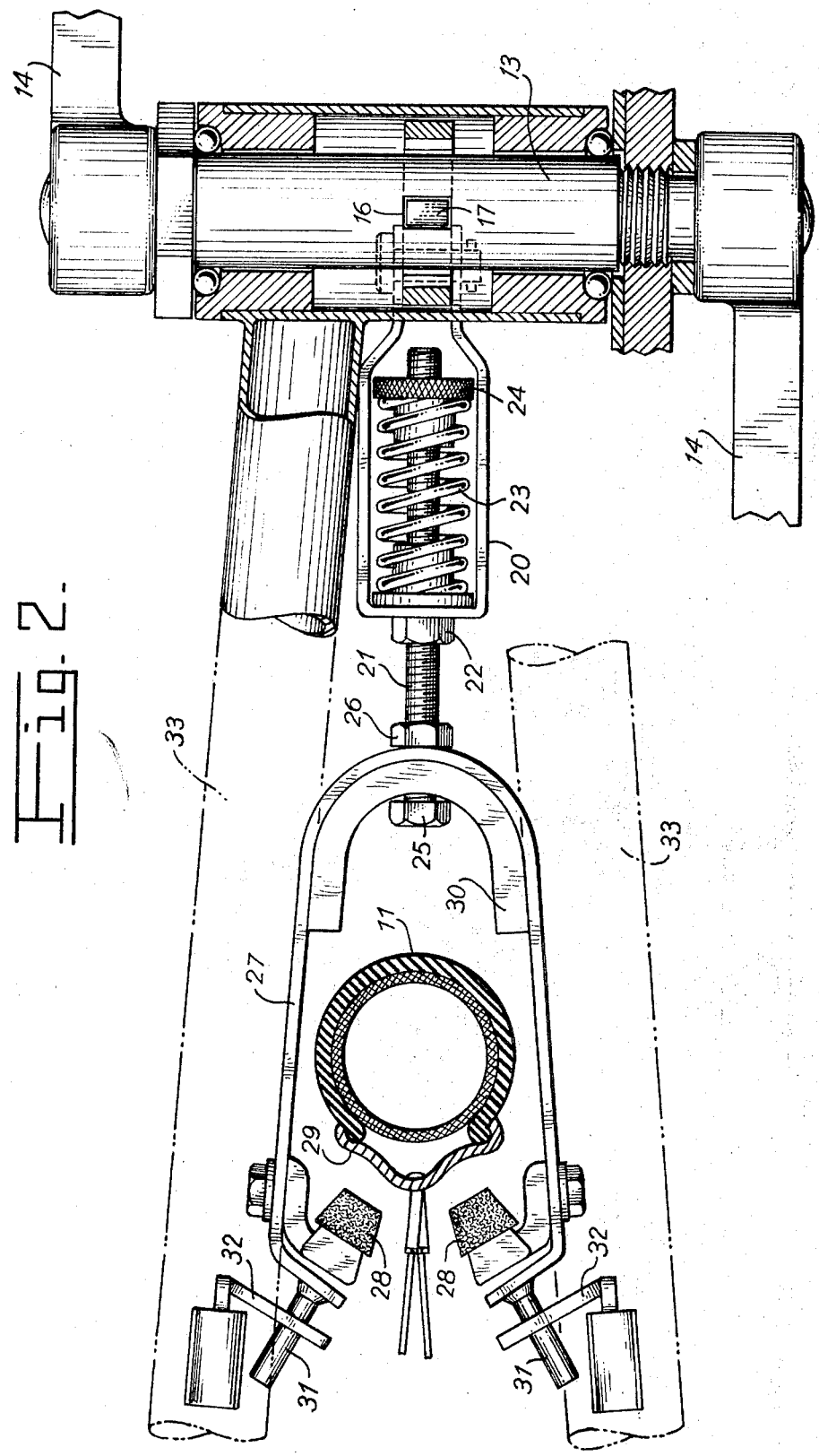

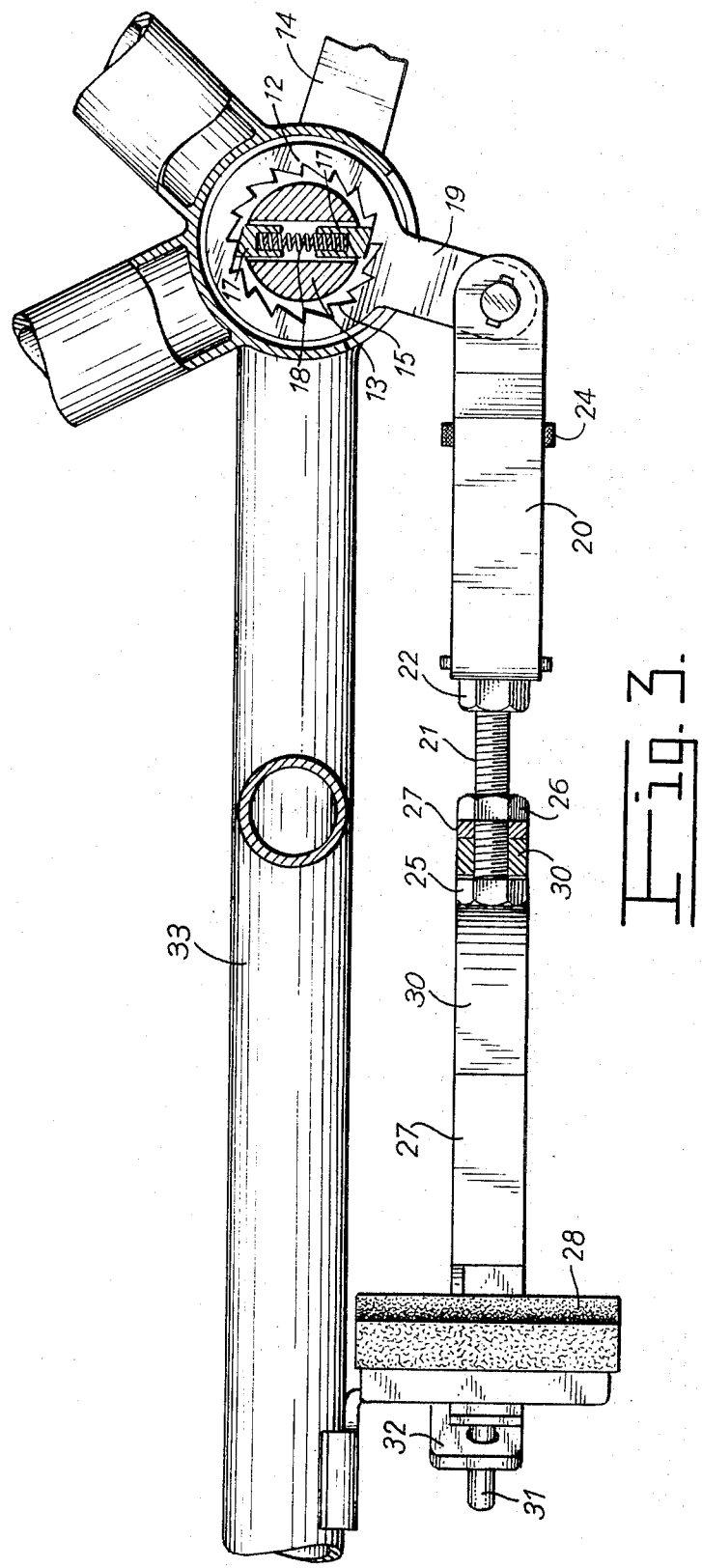

BICYCLE FOOT BRAKES

BACKGROUND OF THE INVENTION

The most commonly known bicycle brakes consist of yokes acting as clamps with skids at their ends, which skids rub against the edges of the bicycle tires to prevent wheel movement. These clamps are driven by levers placed at the handle-bar of the bicycle, thus providing the braking action.

It has been found that the abovedescribed brakes are not adequate, since they do not have suitable power because they act in function of the bicycle rider's manual force. Thus, the brakes in which the rider's weight is applied or counterpedal brakes, were developed, which brakes are operated by pedaling in reverse. With this the hub of the rear wheel is fixed by means of the sliding of a conical member which tightens it until it cannot be moved.

There are several counterpedal brakes, but the most usual type is the one known as counterpedal and free pinion which fulfills three functions: Driving the bicycle, pedaling forwards; free coasting, not moving the pedals; and braking by pedaling backwards.

The first function is attained by suitably moving rollers that act against a rotating cylinder, which rollers are housed in a guide ring. The bicycle wheel is fixed to a threaded head arranged in such a manner that when pedaling forwards the rollers turn and they are compressed against a hub which is fixed to the wheel. Thus, they press the hub in such a way that the wheel rolls when the threaded head rotates.

Free coasting is also attained in the aforementioned way, but in this case the threaded head remains immobile while the bicycle wheel is still rolling with which the rollers remain in recesses of the threaded head which recesses are in such a way that the hub and wheel fixed to the same are allowed to turn freely forwards with respect to the threaded head.

Lastly, in the case of braking, as previously indicated it would be necessary to move the pedals backwards by means of which two conical bodies are introduced into a grooved sleeve providing a widening and compression against the inside surface of the hub of the wheel preventing rolling. The widening of the sleeve is due to a guide ring including projections immobilizing one of the conical pieces, i.e., that for braking. At the same time this conical breaking piece is introduced into the grooved sleeve pushing it against another of the conical pieces which is fixed, thus affording the widening of both sides of said sleeve. In order for the conical braking piece not to rotate when pedaling backwards rollers are included, which rollers are retained by springs. These rollers are introduced into splines provided on the inside surface of the sleeve in case the mentioned conical piece rotates. Thus, it is retained allowing, through the effect of the guide ring, displacement of the same until introduction into the sleeve.

These wellknown counterpedal brakes, as have been described, act through the hub of the bicycle wheel. Logically, this is inadequate since the braking is at the bicycle's center and therefore, application of a great force is required.

In addition, counterpedal brakes are impractical since as indicated they are made up of complicated mechanisms which are difficult to repair when being necessary.

OBJECTS OF THE INVENTION

Thus, one of the objects of this invention is to improve bicycle foot brakes driven by the total weight of the rider; consequently, these brakes are power brakes.

A further object of the invention, is to provide improvements for bicycle foot brakes not driving the hub of the bicycle's rear wheel.

Still another object of the invention, is to provide improvements in bicycle foot brakes which fix the bicycle's rear wheel at its edge.

Another of the invention's objects is to provide bicycle foot brakes which are simple and practical.

Yet another object of this invention, is to provide improvements in bicycle foot brakes making them very easy to repair.

Finally, one more object of this invention is to improve bicycle foot brakes of the type in which by turning the pedals in reverse a mechanism is activated preventing one of the wheels from rolling. This type of brake is characterized by the mechanism consisting of lever means including an annular portion coupled to the pedal shaft and a lug pivotly fixed at one end of a guiding and joining structure slidingly housing a portion of a bolt, which bolt act has the other portion end fixed to a yoke that is the brake as such.

These and other objects to be fulfilled by putting this invention into practice, will be better understood and appreciated by reading the following description which refers to the drawings of the preferred embodiment of this invention.

DESCRIPTION OF THE DRAWINGS

FIG. 2 is a top plan view, illustrating the improved bicycle foot brakes and showing a conventional cross section of the tube including the pedal shaft and the rear wheel.

FIG. 3 is a conventional longitudinal cross section view, showing the improved foot brakes of the present invention.

DETAILED DESCRIPTION OF THE INVENTION

Figure 1:
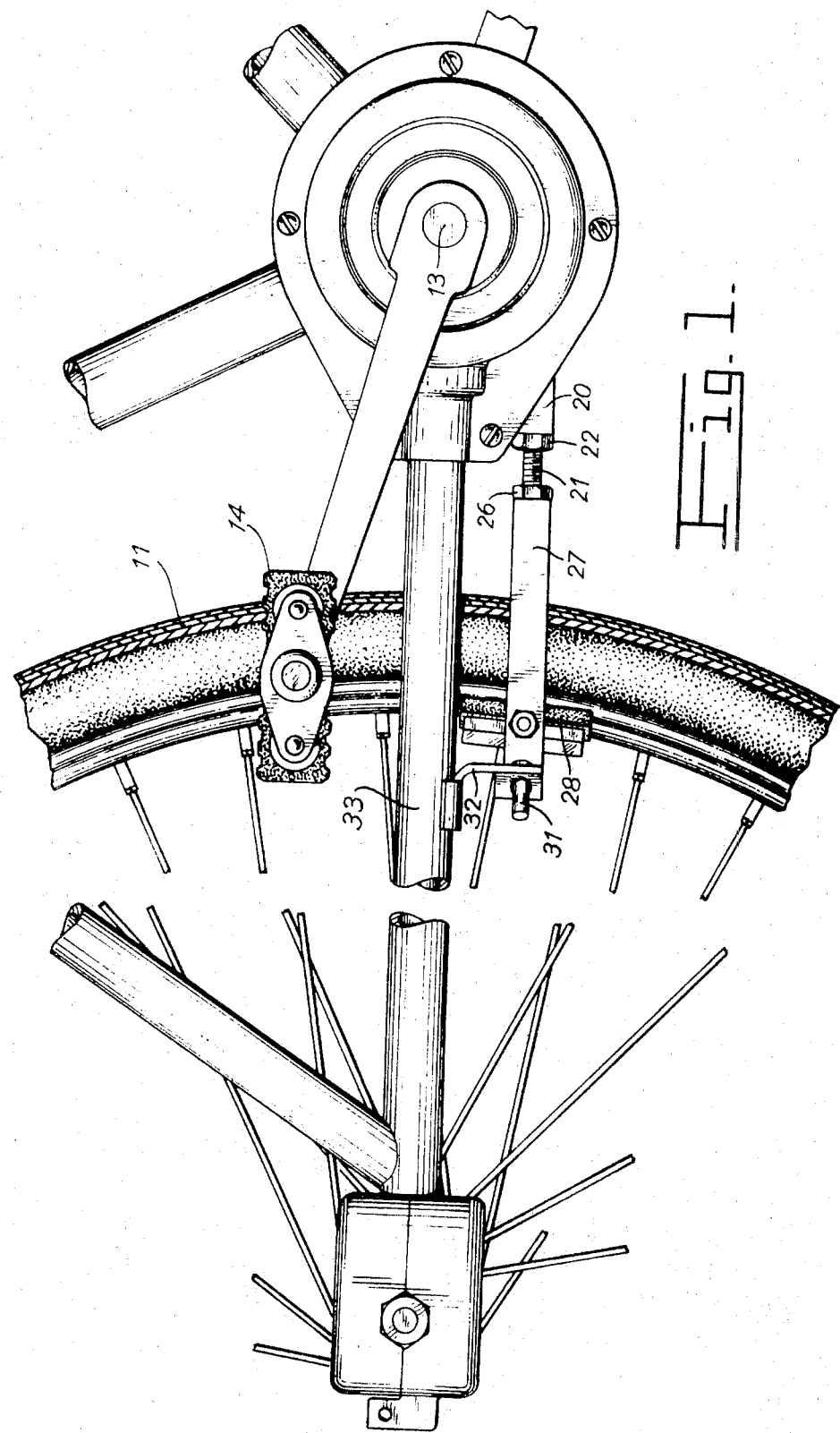
FIG. 1 is a vertical side view of the improved bicycle foot brakes showing the case in which the braking is in the rear wheel.

This invention relates to bicycle brakes, more specifically, to improvements in bicycle foot brakes of the type that when driven prevent rolling of the wheels, in this case the rear wheel 11, which wheel 11 is stopped by applying pressure to its edge.

The foot brakes covered by this invention comprise lever means including an annular portion 12 (see FIG. 3), which is connected to a shaft 13 that rotates by movement of pedals 14. The annular portion 12 comprises in the portion coinciding with the shaft 13, a series of consecutive, stairstep, sloping grooves 15 and, also, said shaft 13 includes in its portion conciding with the annular portion 12, an orifice 16 which houses pawls 17 interconnected by means of a spring 18 so that these pawls 17 can be pushed one against the other allowing passage of the grooves 15 of the annular portion 12 when the shaft 13 rotates opposite to forwards. In this way, the passage of the grooves 15 is prevented when the mentioned shaft 13 rotates backwards. This is feasible because the sharpest parts of the pawls 17 are placed diametrically opposed to each other and make contact with the annular portion 12 either coupling or not with the series of grooves 15.

The lever means also includes a protruding integral lug 19 pivotly fixed to an end of a guiding and joining structure 20. This structure 20 slidingly houses, as illustrated in FIG. 2, a portion of a threaded bolt 21 fixed on the outside to the mentioned guiding and joining structure 20 by nut locks 22. The portion of the bolt 21 remaining in the inside of the guiding and joining structure 20 includes a helical spring 23 fixed to said bolt 21 by means of nuts 24. In this way the structure 20 is forced against the nut lock 22 by the spring 23 and has a sliding trajectory until touching the nut 24.

The end of the bolt 21, outside to the structure 20, is fixed by means of a nut 25 and a nut lock 26 to a yoke 27 which is the brake as such. This yoke 27 is U-shaped and it includes at its ends skids 28 which, when the brake is driven, are forced into contact with a rim 29 of the wheel 11 pressing it until the rolling of the wheel 11 is stopped.

The bolt 21 is fixed to the bent portion of the yoke 27; and for the yoke 27 to be reinforced at this point, a U-shaped plate 30 is included preventing the bent portion of said yoke 27 from bending due to the effect of the force applied when the brake is actuated.

To guide the yoke's slipping its ends opposite to the skids 28 include cylindrical protrusions 31 which are introduced into angular plates 32 fixed to tubes 33 making up the lower support fork of the wheel 11.

In the aforementioned manner, and because of the relation of the structural elements of the foot brake of the present invention, when pedaling forwards, the axle 13 rotates in such a way that the pawls 17 are forced to contract due to the slope of the series of stair-step grooves 15, to the chamfer of the protruding end of these pawls 17 and to the spring 18 coupling them. On the other hand, if the axle 13 is rotated in the reverse direction by the pedals 14, these pawls 17 are introduced into the deeper parts of the grooves 15 and only straight parts of the sharp parts of the pawls 17 and the stairstep consecutive grooves 15, are in contact; thus, the annular lever 12 is forced to turn in reverse. With this movement, the lug 19 undergoes a forward displacement pulling with it the structure 20 and this in turn, overcoming the spring 23 by means of the bolt 21, carries with it the yoke 27 forcing into contact the skids 28 with the rim 29 of the wheel 11, thus obtaining the adequate power braking.

The abovedescribed mechanism is considered as powerbraking, because the brakes are driven applying a force much greater than manual force. The force is from the entire body and the rolling of the wheel 11 is stopped at the edge, where the speed is much less than in the center. Thus this force is more effective.

Notwithstanding the fact that the foregoing description has been made with regard to a specific embodiment of the invention, those skilled in the art should understand that any change in form or detail will be included within the range and scope of same.

I claim:

1. Foot brakes for bicycles comprising an axle;
    pedals coupled to the end portions of said axle;
    lever means for preventing bicycle's wheels from rolling when said pedals are turned in reverse;
    a guiding and joining structure pivotally held by said means for preventing the wheels from rolling;
    a yoke including skid means;
    a bolt coupling said guiding and joining structure to said yoke;
    the improvement wherein
    said lever means for preventing the wheels from rolling comprises an annular portion coupled around said axle in the middle portion of same, and a protruding lug integral to said annular portion;
    said bolt includes an end portion of same slidingly housed in said guiding and joining structure and its end opposite to said end housed by said guiding and joining structure fixed to said yoke;
    a helical spring is included surrounding said portion of said bolt housed by said guiding and joining structure, said helical spring being fixed at one of its ends to said end of said bolt housed in said joining and guiding structure, and the other of its ends urging said guiding and joining structure;
    an orifice is included in said axle, in that portion of same registering with said annular portion, said orifice crossing said axle of said pedals through all its diameter; and
    two spring loaded pawls are included housed in said orifice, which pawls are spring loaded by the same one spring.

2. Foot brakes for bicycles in accordance with claim 1, wherein
    said pawls comprise their sharpest parts diametrically opposed.

3. Foot brakes for bicycles in accordance with claim 2, wherein
    said annular portion comprises in its said portion registering with said axle of said pedals, consecutive stairstep slopping grooves.

* * * * *